(12) United States Patent
Virkler et al.

(10) Patent No.: US 8,776,347 B2
(45) Date of Patent: Jul. 15, 2014

(54) TOOL FOR ROTOR ASSEMBLY AND DISASSEMBLY

(75) Inventors: Scott D. Virkler, Ellington, CT (US); Matthew P. Ricker, Reno, NV (US); Gordon Kinkade, Willington, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/537,844

(22) Filed: Jun. 29, 2012

(65) Prior Publication Data

US 2014/0000084 A1     Jan. 2, 2014

(51) Int. Cl.
*B23P 11/02* (2006.01)
*B23P 19/04* (2006.01)
*B25B 7/04* (2006.01)

(52) U.S. Cl.
USPC .............. 29/450; 29/235; 29/229; 81/385

(58) Field of Classification Search
USPC .............. 29/451, 235, 229; 81/385–387, 302, 81/415
See application file for complete search history.

(56) References Cited

U.S. PATENT DOCUMENTS

| | | | |
|---|---|---|---|
| 2,483,383 A * | 9/1949 | Heimann et al. | 29/229 |
| 2,792,513 A * | 5/1957 | Rashevsky | 310/270 |
| 3,356,339 A | 12/1967 | Thomas et al. | |
| 3,581,851 A | 6/1971 | Hall | |
| 3,597,828 A * | 8/1971 | Clark | 29/229 |
| 3,768,924 A | 10/1973 | Corsmeier et al. | |
| 4,175,310 A | 11/1979 | Boyd | |
| 4,689,865 A | 9/1987 | Chamblee | |
| 4,744,132 A | 5/1988 | Greene et al. | |
| 5,052,891 A | 10/1991 | Burkholder | |
| 5,862,577 A | 1/1999 | Zimmerman et al. | |
| 6,280,335 B1 * | 8/2001 | Wehner et al. | 464/130 |
| 6,481,917 B1 | 11/2002 | Chen et al. | |
| 6,507,985 B1 * | 1/2003 | Loughlin et al. | 29/229 |
| 6,821,207 B2 * | 11/2004 | Bommarito et al. | 464/130 |
| 6,993,816 B2 * | 2/2006 | Greenhill | 29/229 |
| 8,032,970 B2 * | 10/2011 | Chen | 15/160 |
| 2007/0144172 A1 | 6/2007 | Sumser et al. | |

OTHER PUBLICATIONS

International Search Report and Written Opinion from PCT Application Serial No. PCT/US2013/048170, dated Nov. 21, 2013, 11 pages.

* cited by examiner

*Primary Examiner* — David Bryant
*Assistant Examiner* — Jun Yoo
(74) *Attorney, Agent, or Firm* — Kinney & Lange, P.A.

(57) ABSTRACT

An apparatus includes a body, a driver, a plurality of shafts, and a plurality of arms. The body is configured for insertion into a component and the driver is adapted for movement relative to the body. The plurality of shafts extend through the body and are connected to the plurality of arms. The tool is configured such that contact by the driver against the shaft rotates the plurality of shafts to pivot the plurality of arms.

19 Claims, 7 Drawing Sheets

TOOL FOR ROTOR ASSEMBLY AND DISASSEMBLY

BACKGROUND

The present invention relates to gas turbine engines. In particular, the invention relates to a tool for assisting in coupling and decoupling rotor disks of gas turbine engines.

Gas turbine engines typically include a compressor section and a turbine section. The turbine section is coupled for rotation with the compressor section. Both sections may include one or more stages of rotors that can be axially held together by coupling elements such as sleeves, bolts or other types of fasteners. However, if the coupling element(s) comes loose, one or more of the rotors may be free to move axially, resulting in an over speed condition.

SUMMARY

An apparatus includes a body, a driver, a plurality of shafts, and a plurality of arms. The body is configured for insertion into a component and the driver is adapted for movement relative to the body. The plurality of shafts extend through the body and are connected to the plurality of arms. The tool is configured such that contact by the driver against the shaft rotates the plurality of shafts to pivot the plurality of arms.

A method of assembling a first component with a second component includes a tool with a plurality of arms that is inserted into a bore of the first component. A retention element is positioned adjacent the first component and engaged with the plurality of arms to decrease a diameter of the retention element. The second component is positioned relative to the first component and the plurality of arms are disengaged from the retention element to allow the retention element to increase in diameter and engage with both the first component and the second component.

A method of disassembling a first component and a second component includes a tool with a plurality of arms that is inserted into a bore of the first component. The plurality of arms engage the retention element to decrease a diameter of the retention element and disengage the retention element from both the first component and the second component.

DETAILED DESCRIPTION

The present invention provides a tool that can be used for accurate and easily repeatable assembly and disassembly of components including rotor disks of a gas turbine engine. In particular, the tool is adapted to be insertable in and removable from small diameter spaces such as disk bores. The tool can accurately locate, insert, and remove components very precisely, even in small gaps between the components. The tool also allows for location, insertion, and removal in instances where assembly and disassembly is performed blind (i.e. without a worker being able to see into the coupling area of the components being assembled or disassembled).

Although generally applicable to situations that have blind assembly, precise positioning, and/or limited access, in one exemplary application, the tool described can be utilized to couple and decouple a first disk of a gas turbine engine from an adjacent second disk. In this application, the tool is sized to fit within a bore of the first disk and extend to a desired axial location where coupling between the first disk and the second disk occurs. At this coupling location, a retention element comprising a partial ring with hooks at both ends is positioned to prevent or limit relative axial movement between the first rotor and the second rotor. To position the retention element for coupling of the first disk with the second disk, the tool rotates the arms against the hooks of the retention element to reduce the diameter of the retention element. The reduced diameter of the retention element allows the retention element to be located with clearance within the first disk and second disk. Once the first disk and the second disk are positioned in a desired location relative to one another, the arms of the tool are pivoted out of contact from hooks and the retention element expands to prevent or limit relative axial movement between the first rotor and the second rotor. As will be discussed subsequently, the tool can be used to remove the retention element from between the first rotor and the second rotor during disassembly.

Figure 1:
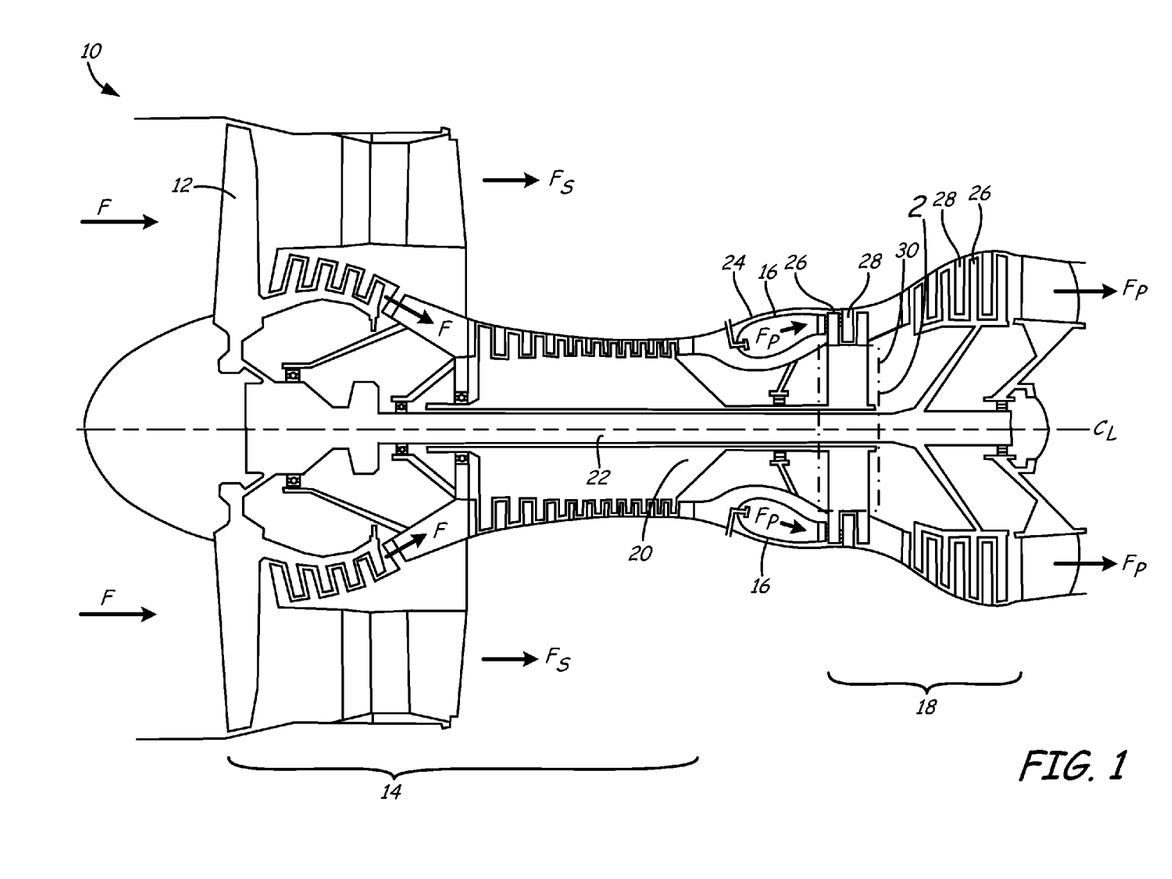
FIG. 1 is a sectional view of an exemplary gas turbine engine with an assembly of disks.

FIG. 1 is a representative illustration of a gas turbine engine including disks that can be coupled using a tool described herein. The view in FIG. 1 is a longitudinal sectional view along an engine center line. FIG. 1 shows gas turbine engine 10 including fan 12, compressor 14, combustor 16, turbine 18, high-pressure rotor 20, low-pressure rotor 22, and engine casing 24. Turbine 18 includes rotor stages 26 and stator stages 28. FIG. 1 also shows an assembly 30 of at least two rotors that benefit from the present invention.

As illustrated in FIG. 1, fan 12 is positioned along engine center line ($C_L$) at one end of gas turbine engine 10. Compressor 14 is adjacent fan 12 along engine center line $C_L$, followed by combustor 16. Turbine 18 is located adjacent combustor 16, opposite compressor 14. High-pressure rotor 20 and low-pressure rotor 22 are mounted for rotation about engine center line $C_L$. High-pressure rotor 20 connects a high-pressure section of turbine 18 to compressor 14. Low-pressure rotor 22 connects a low-pressure section of turbine 18 to fan 12. Rotor stages 26 and stator stages 28 are arranged throughout turbine 18 in alternating rows. Rotor stages 26 connect to high-pressure rotor 20 and low-pressure rotor 22. Engine casing 24 surrounds turbine engine 10 providing structural support for compressor 14, combustor 16, and turbine 18, as well as containment.

In operation, air flow F enters compressor 14 through fan 12. Air flow F is compressed by the rotation of compressor 14 driven by high-pressure rotor 20. The compressed air from compressor 14 is divided, with a portion going to combustor 16, and a portion employed for cooling components exposed to high-temperature combustion gases, such as stator vanes. Compressed air and fuel are mixed and ignited in combustor 16 to produce high-temperature, high-pressure combustion gases Fp. Combustion gases Fp exit combustor 16 into turbine section 18. Stator stages 28 properly align the flow of combustion gases Fp for an efficient attack angle on subsequent rotor stages 26. The flow of combustion gases Fp past rotor stages 26 drives rotation of both high-pressure rotor 20 and low-pressure rotor 22. High-pressure rotor 20 drives a high-pressure portion of compressor 14, as noted above, and low-pressure rotor 22 drives fan 12 to produce thrust Fs from gas turbine engine 10. Although embodiments of the present invention are illustrated for a turbofan gas turbine engine for aviation use, it is understood that the present invention applies to other aviation gas turbine engines and to industrial gas turbine engines as well.

Figure 2:
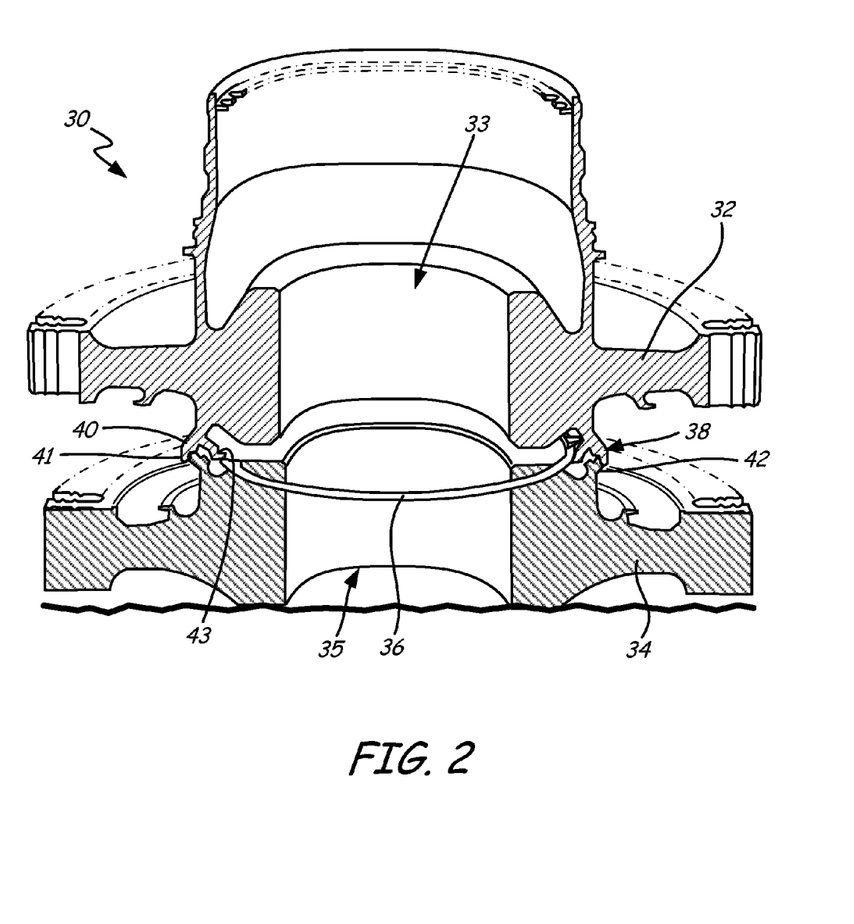
FIG. 2 is a cross-sectional view of an assembly of a first disk, a retention element, and a second disk.

FIG. 2 is an enlarged view of assembly 30 from turbine 18 of gas turbine engine 10 (FIG. 1). Assembly 30 includes a first disk 32, a second disk 34, a retention element 36, and a locking mechanism 38. First disk 32 includes a central bore 33. Second disk 34 includes a central bore 35. Locking mechanism 38 includes an axial projection 40 of first disk 32 and an axial projection 42 of second disk 34.

Because the design and operation of retention element 36 and locking mechanism 38 is described in co-pending U.S. application Ser. No. 13/523,272, entitled ROTOR ASSEMBLY WITH INTERLOCKING TABS, the entire disclosure of which is incorporated herein by reference, retention element 36 and locking mechanism 38 will not be described in great detail.

In brief, axial projection 40 of locking mechanism 38 has a circumferential series of dogs and slots (not shown) and an outer lip 41. Similarly, axial projection 42 of locking mechanism 38 has a similarly sized series of dogs and slots (not shown). For assembly, dogs of axial projection 40 insert into slots of axial projection 42. Similarly, dogs of axial projection 42 insert into slots of axial projection 40.

When first disk 32 and second disk 34 are positioned so dogs and slots are interlocked and outer lip 41 of axial projection 40 extends and is received by axial projection 42, axial projection 40 and axial projection 42 define a circumferential channel 43. Retention element 36 is located in circumferential channel 43 to lock axial projection 40 and axial projection 42 together. Thus, first disk 32 and second disk 34 are coupled together for co-rotation through locking mechanism 38 in combination with retention element 36. In particular, the interlocking of axial projection 40 and axial projection 42 via dogs and slots as well as lip 41 circumferentially and rotationally locks first disk 32 and second disk 34 together. Retention element 36 within channel 43 prevents or limits relative axial movement between first disk 32 and second disk 34. Thus, first disk 32 and second disk 34 are rotationally and axially coupled together. The rotational and axial coupling of first disk 32 and second disk 34 ensures that the second disk 34 will not axially disengage from first disk 32 in the case that the connection provided by a tie rod (not shown) is lost. Furthermore, the locking mechanism 38 is compact and can be used as a design replacement where packaging considerations do not permit bolted or other types of locking designs.

Figures 3, 3A:
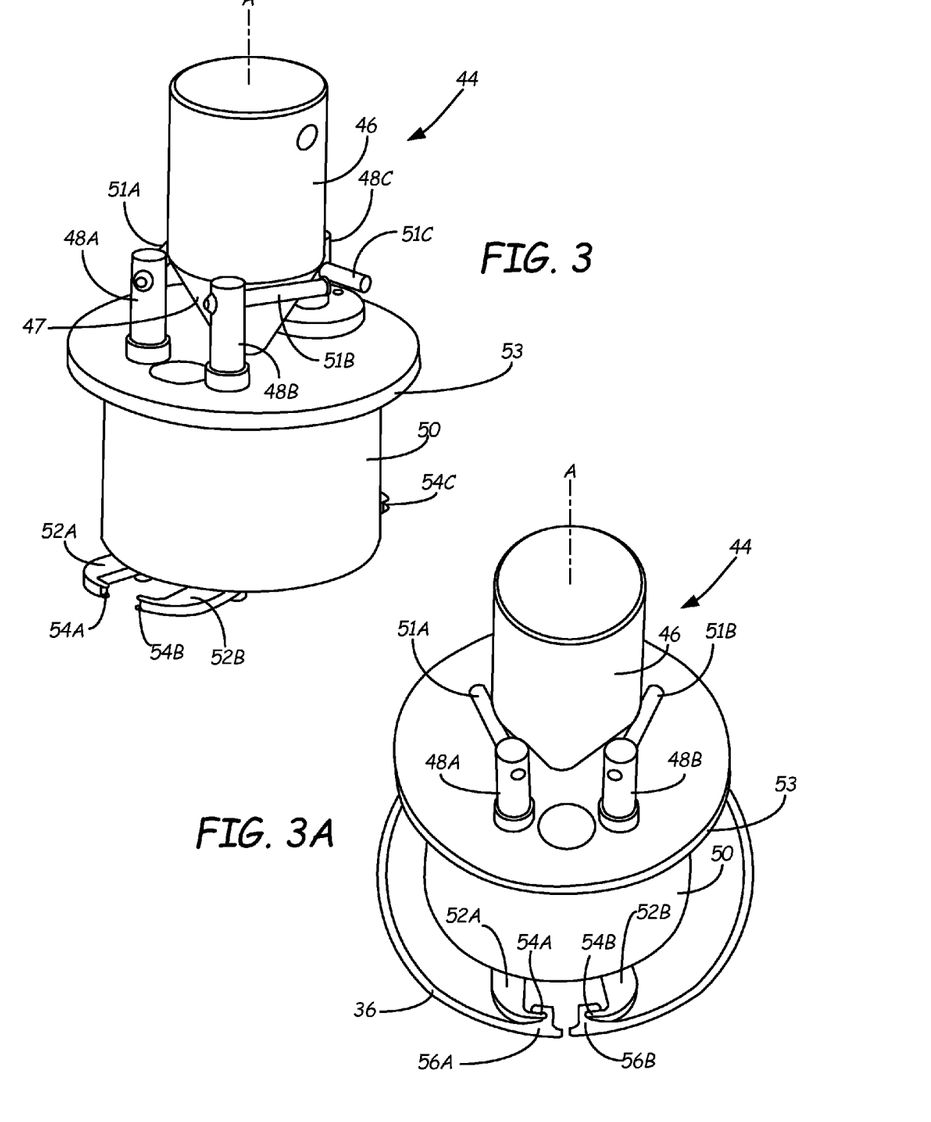
FIG. 3 is a perspective view of one embodiment of a tool including a driver, body, shafts, and arms.
FIG. 3A is a perspective view of the tool of FIG. 3 engaging the retention element.
Figure 3B:
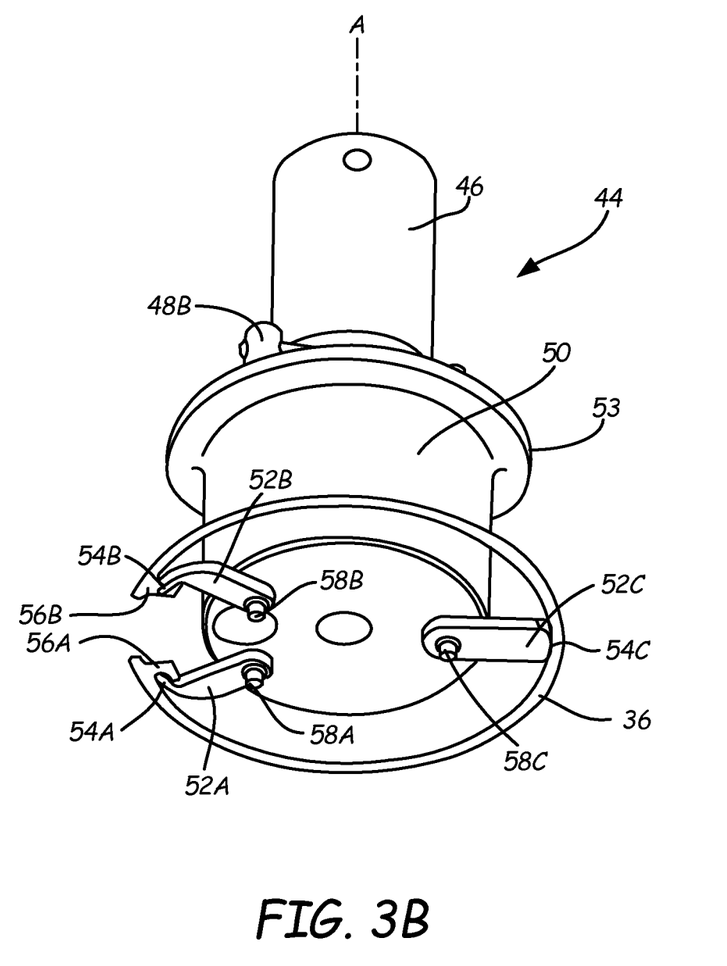
FIG. 3B is a bottom view of the tool of FIG. 3 engaging the retention element.

FIGS. 3, 3A, and 3B illustrate one embodiment of a tool 44. As shown in FIG. 3, tool 44 includes a driver 46 with a conical portion 47, shafts 48A, 48B, and 48C, a body 50, links 51A, 51B, and 51C, arms 52A, 52B, and 52C, and a lip 53. Arms 52A, 52B, and 52C include channels 54A, 54B, and 54C. FIGS. 3A and 3B illustrate tool 44 engaged with retention element 36. As shown in FIGS. 3A and 3B, retention element 36 includes hooks 56A and 56B.

Conical portion 47 of driver 46 is positioned adjacent shafts 48A, 48B, and 48C. Driver 46 is mounted on an upper face of body 50 and is movable relative thereto to vary the height of conical portion 47. In particular, driver 46 is adapted to be selectively rotated about an axis A via threads to vary the height of the driver 46 relative to the main body 50 and shafts 48A, 48B, and 48C.

In the embodiment shown in FIGS. 3, 3A, and 3B, links 51A, 51B, and 51C extend from each shaft 48A, and 48B to engage the conical portion 47 of the driver 46. Shafts 48A, 48B, and 48C extend through body 50 and are disposed about driver 46. Body 50 has a cylindrical shape and includes a larger diameter lip 53 to allow for a desired axial positioning of tool 44 within a component such as first disk 32 (FIG. 2).

As shown in FIG. 3B, arms 52A, 52B, and 52C are coupled to shafts 48A, 48B, and 48C via connections such as pins 58A, 58B, and 58C. In the embodiments shown in FIGS. 3, 3A, and 3B, arms 52A, 52B, and 52C are disposed in close proximity to a second lower face of body 50 and are adapted to pivot with rotation of shafts 48A, 48B, and 48C. Arms 52A and 52B are shaped as hooks with channels 54A and 54B extending along the outer tip portion of the hook. Although not shaped as a hook, arm 52C includes channel 54C along an outer portion thereof. Arm 52C acts to further retain retention element 36 to keep retention element 36 from warping out of a hoop shape. Thus, arm 52C helps to maintain retention element 36 in a ring shape with a substantially axially uniform position.

As shown in FIGS. 3A and 3B, retention element 36 is disposed below and has a slightly larger diameter than body 50. Retention element 36 has hooks 56A and 56B at either end thereof. Hooks 56A and 56B can be engaged by arms 52A, and 52B as illustrated. More particularly, channels 54A, 54B, and 54C are adapted to receive the inner edges including portions of hooks 56A and 56B of retention element 36 therein.

In operation, contact by the conical portion 47 of driver 50 rotates the plurality of shafts 48A, 48B, and 48C to pivot the plurality of arms 52A, 52B, and 52C into or out of engagement with retention element 36. In particular, rotational treaded movement of driver 50 varies the height of conical portion 47 relative to shafts 48A, 48B, and 48C, body 50 and links 51A, 51B, and 51C. Contact between links 51A and 51B and conical portion 47 causes rotation of shafts 48A and 48B. Link 51C can be independently actuated, for example by hand or other means to rotate shaft 48C. Thus, driver 50 is rotated in one direction (e.g., clockwise) to increase the diameter of conical portion 47 contacting links 51A and 51B. As a result, shafts 48A and 48B are rotated to pivot arms 52A and 52B toward one another and decrease the diameter of retention member 36. If it is desirable to increase the diameter of retention member 36, driver 50 is rotated in an opposing direction (e.g., counterclockwise) to decrease the diameter of conical portion 47 contacting links 51A and 51B. As a result, shafts 48A and 48B are rotated to pivot arms 52A and 52B away from one another.

As shown in FIGS. 3 and 3A, conical portion 47 as a uniform surface area and at least links 51A and 51B are positioned at a same height relative to body 50. This arrangement allows for shafts 48A and 48B to rotate a substantially similar distance as the result of engagement by the conical portion 47. Driver 50 is capable of being actuated by known means including by hand as well as mechanical, electrical, hydraulic, pneumatic, or other means.

Figure 4A:
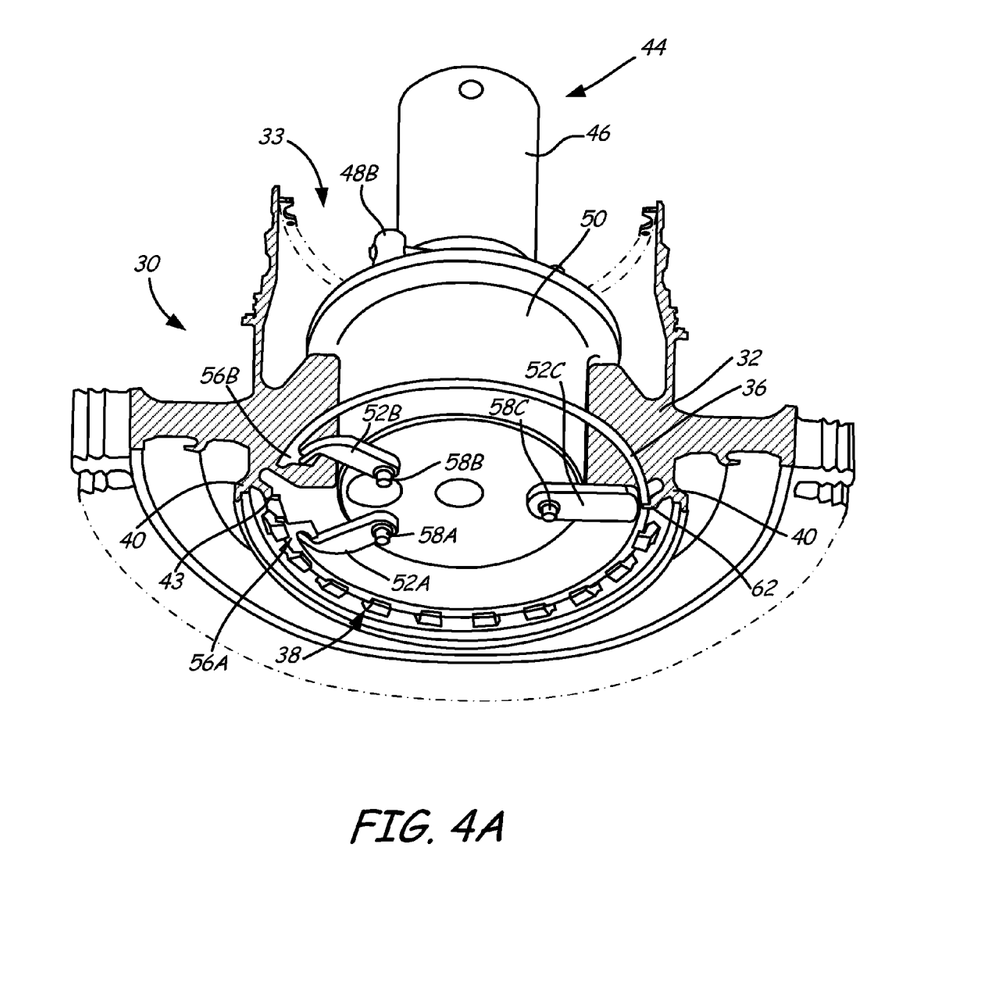
FIG. 4A is a perspective view of the tool of FIG. 3 inserted in the first disk and engaging the retention element.
Figure 4B:
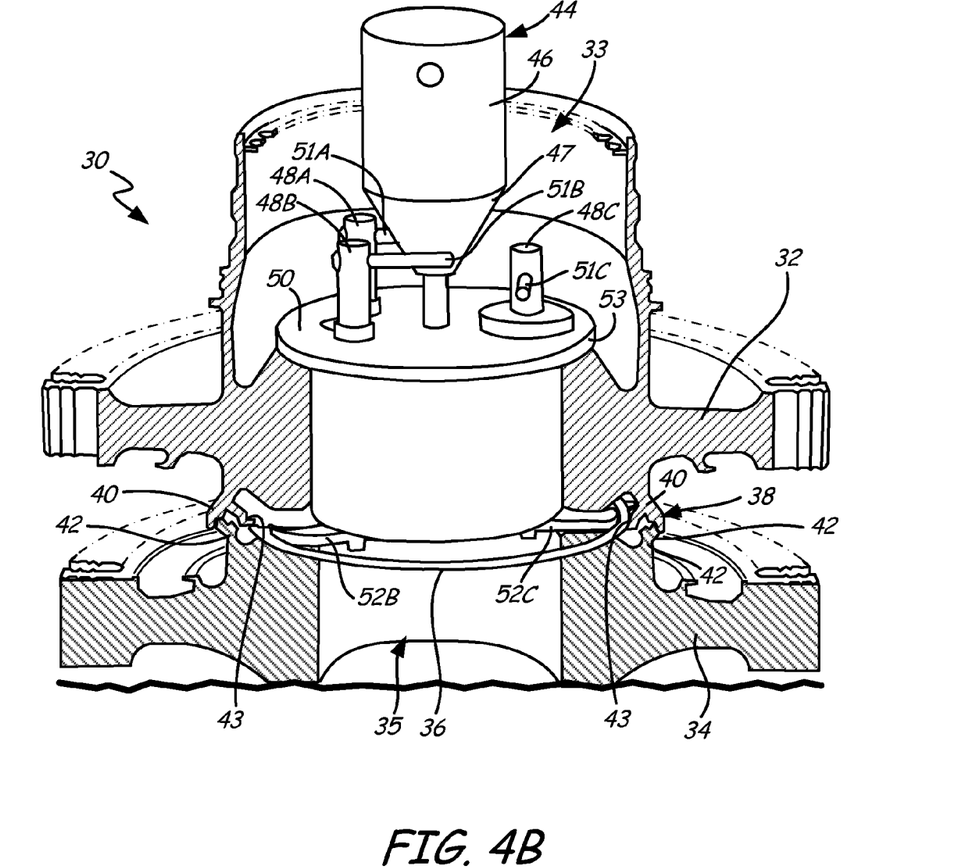
FIG. 4B is a perspective view of the tool of FIG. 3 inserted in the assembly of FIG. 2.

FIGS. 4A and 4B show tool 44 inserted into first disk 32. Parts of assembly 30 also illustrated in FIGS. 4A and 4B include central bore 33, second disk 34, central bore 35, retention element 36, and locking mechanism 38. Locking mechanism 38 includes axial projection 40 of first disk 32 and axial projection 42 of second disk 34. Axial projections 40 and axial projection 42 include circumferential channel 43.

Tool 44 includes driver 46, conical portion 47, shafts 48A, 48B, and 48C, body 50, links 51A, 51B, and 51C, arms 52A, 52B, and 52C, and lip 53.

During assembly of first disk 32 to second disk 34, tool 44 is inserted into bore 33 of first disk 32 until lip 53 of body 50 contacts an axially extending surface of first disk 32. As shown in FIG. 4A, body 50 is sized in both the axial and radial directions to extend through bore 33 to dispose arms 52A, 52B, and 52C in a desired location, in this instance, substantially aligned with a portion of channel 43 in locking mechanism 38. During insertion of tool 44, arms 52A, 52B, and 52C can be pivoted to an inward facing location so that arms 52A, 52B, and 52C do not extend past the diameter of body 50. After tool 44 is positioned to extend into first disk 32 as shown in FIG. 4A, retention element 36 is moved to a position adjacent axial projection 40 of first disk 32. Driver 46 is actuated from an accessible location to pivot arms 52A, 52B, and 52C into contact with hooks 56A and 56B of retention element 36. Arms 52A, 52B supply sufficient force to decrease the diameter of retention element 36 and give retention element 36 a clearance with respect to axial projection 40. Once the diameter of the retention element 36 is decreased to provide clearance, second disk 34 is positioned adjacent to first disk 32. The positioning of second disk 34 mounts second disk 34 to first disk 32. As described previously, the positioning involves mounting second disk 34 to first disk 32 such that the dogs and slots are interlocked. After such an arrangement is accomplished, arms 52A, 52B, and 52C are pivoted to disengage from the retention element 36. Disengagement of the arms 52A, 52B, and 52C allows the retention element 36 to increase in diameter and engage channel 43 in both first disk 32 and second disk 34. Arms 52A, 52B, and 52C are pivoted to an inward facing location so that arms 52A, 52B, and 52C do not extend past the diameter of body 50 and tool 44 is removed from bore 33 of first disk 32.

During disassembly of first disk 32 from second disk 34, tool 44 is inserted into bore 33 of first disk 32 until lip 53 of body 50 contacts an axially extending surface of first disk 32. Body 50 is sized in both the axial and radial directions to extend through bore 33 to dispose arms 52A, 52B, and 52C in a desired location substantially aligned with retention element 36. During insertion of tool 44, arms 52A, 52B, and 52C can be pivoted to an inward facing location so that arms 52A, 52B, and 52C do not extend past the diameter of body 50. After tool 44 is positioned to extend through first disk 32, driver 46 is actuated from an accessible location to pivot arms 52A, 52B, and 52C into contact with hooks 56A and 56B of retention element 36. With further actuation of driver 46, arms 52A, 52B supply sufficient force to decrease the diameter of retention element 36 and disengage retention element 36 from channel 43 in second disk 34 and first disk 32. Second disk 34 is then free to be removed axially away from first disk 32 by disengaging the dogs and slots.

Figure 5:
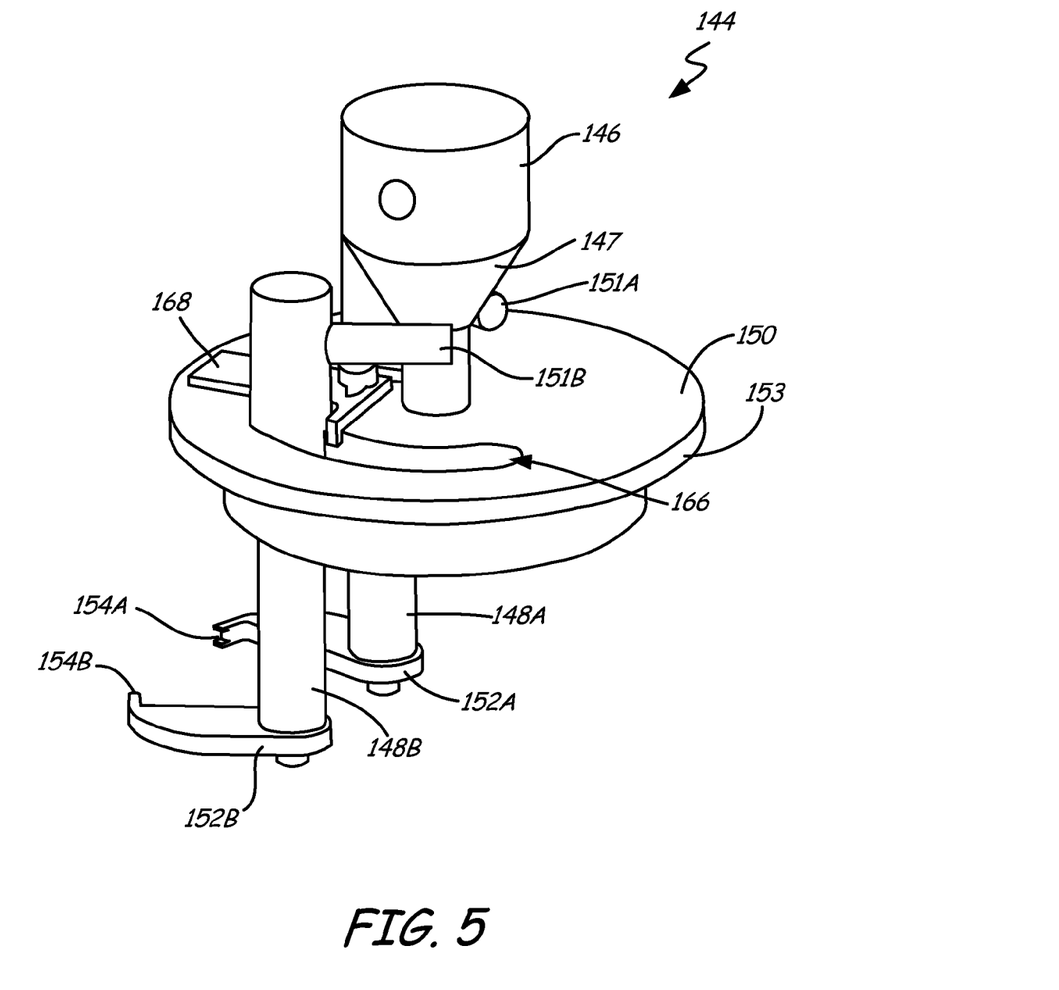
FIG. 5 is a perspective view of a second embodiment of the tool including a channel in addition to the driver, body, shafts, and arms.

FIG. 5 shows a second embodiment of tool 144. Tool 144 includes a driver 146 with a conical portion 147, shafts 148A and 148B, a body 150, links 151A and 151B, arms 152A and 152B, and a lip 153. Arms 152A and 152B include channels 154A (not shown) and 154B. Tool additionally includes a channel 166 and a retention plate 168.

In most instances, tool 144 is configured and operates in a manner similar to tool 44 describe previously. However, the addition of channel 166 allows shaft 148B (as well as link 151B and arm 152B connected to shaft 148B) to be translated as well as rotated. Thus, shaft 148B (and components connected thereto) can be selectively moved relative to body 150 and the driver 146. Shaft 148B can be moved to various positions along channel 166 and secured in place by retention plate 168. Retention plate 168 is adapted to be fastened or otherwise affixed to various locations along body 150. During disassembly of first disk 132 from second disk 134, channel 166 allows shaft 148B and arm 152B to be translated as well as rotated into contact with retention element.

The present invention provides a tool that can be used for accurate and easily repeatable assembly and disassembly of components including rotor disks of a gas turbine engine. In particular, the tool is adapted to be insertable in and removable from small diameter spaces such as disk bores. The tool can accurately locate, insert, and remove components very precisely, even in small gaps between the components. The tool also allows for location, insertion, and removal in instances where assembly and disassembly is performed blind (i.e. without a worker being able to see into the coupling area of the components being assembled or disassembled).

In a further embodiment of any of the foregoing embodiments, the apparatus may additionally or alternatively include that the driver has a conical portion that is engaged by the plurality of shafts. In a further embodiment of any of the foregoing embodiments, the apparatus may additionally or alternatively include a link extending from each shaft to engage the conical portion of the driver. In a further embodiment of any of the foregoing embodiments, the apparatus may additionally or alternatively include that the driver is adapted to be selectively rotated to vary the height of the driver relative to the main body and plurality of shafts. In a further embodiment of any of the foregoing embodiments, the apparatus may additionally or alternatively include that a portion of the body has a larger diameter to allow for a desired axial positioning of the apparatus within the component. In a further embodiment of any of the foregoing embodiments, the apparatus may additionally or alternatively include that the plurality of shafts rotate a substantially similar distance as the result of engagement by the conical portion. In a further embodiment of any of the foregoing embodiments, the apparatus may additionally or alternatively include that the body includes at least one channel and the at least one channel allows at least one shaft of the plurality of shafts to be selectively moved relative to the body and the driver. In a further embodiment of any of the foregoing embodiments, the apparatus may additionally or alternatively include that the plurality of arms include a channel along a portion thereof. In a further embodiment of any of the foregoing embodiments, the apparatus may additionally or alternatively include a retention element having a first hook at a first end and a second hook at a second end and the retention element is engaged by the plurality of arms and received within the channel. In a further embodiment of any of the foregoing embodiments, the apparatus may additionally or alternatively include that a diameter of the retention element is reduced by engagement with the plurality of arms.

In a further embodiment of any of the foregoing embodiments, the method may additionally or alternatively include engaging a plurality of shafts with a driver of the tool to pivot the plurality of arms. In a further embodiment of any of the foregoing embodiments, the method may additionally or alternatively include rotating the driver to vary the height of the driver relative to a main body and plurality of shafts to pivot the plurality of arms. In a further embodiment of any of the foregoing embodiments, the method may additionally or alternatively include the first and second components comprise first and second disks. In a further embodiment of any of the foregoing embodiments, the method may additionally or alternatively include moving at least one shaft within a channel of a body of the tool to engage the retention element with one of the plurality of arms. In a further embodiment of any of the foregoing embodiments, the method may additionally or alternatively include rotating the at least one shaft in addition to moving the at least one shaft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of manipulating a first component and a second component, the method comprising:
    inserting a tool having a plurality of arms and a lip axially spaced from the arms into a bore of the first component until the lip contacts an axially extending surface of the first component;
    positioning a retention element adjacent the first component;
    engaging the retention element with the plurality of arms to decrease a diameter of the retention element;
    positioning the second component relative to the first component; and disengaging the plurality of arms from the retention element to allow the retention
    element to increase in diameter and engage with both the first component and the second component.

2. The method of claim 1, further comprising engaging a plurality of shafts with a conical surface of a driver of the tool to pivot the plurality of arms.

3. The method of claim 2, rotating the driver to vary the height of the driver relative to a main body and plurality of shafts to pivot the plurality of arms.

4. The method of claim 1, wherein the first and second components comprise first and second disks of a gas turbine engine, respectively, and wherein the retention element engages the first and second disks at a coupling area located radially outward from the bore of the first disk.

5. The method of claim 1, further comprising moving a shaft within a channel of a body of the tool to engage the retention element with one of the plurality of arms.

6. The method of claim 5, further comprising rotating the shaft in addition to moving the shaft.

7. The method of claim 2, wherein the step of engaging the retention element with the plurality of arms to decrease a diameter of the retention element comprises:
    rotating a first of the plurality of arms in a first rotational direction; and
    rotating a second of the plurality of arms in a second rotational direction that is opposite the first rotational direction.

8. The method of claim 3, wherein the plurality of arms are positioned inward from an outer diameter of a substantially cylindrical body of the tool during the step of inserting the tool into the bore of the first component.

9. The method of claim 8, wherein the plurality of arms extend beyond the outer diameter of the substantially cylindrical body of the tool during the step of engaging the retention element disposed between the first component and the second component with the plurality of arms to decrease the diameter of the retention element.

10. The method of claim 4, wherein the step of engaging a retention element disposed between the first component and the second component with the plurality of arms to decrease a diameter of the retention element is performed in a blind manner.

11. The method of claim 1, wherein the plurality of arms engage radially inwardly extending structures of the retention element.

12. The method of claim 1, wherein the step of engaging the retention element with the plurality of arms to decrease the diameter of the retention element comprises displacing an at least partially conical surface of a driver in an axial direction to produce rotation of the plurality of arms.

13. The method of claim 1, further comprising:
    removing the tool from the bore of the first component;
    inserting the tool into the bore of the first component again;
    engaging a retention element disposed between the first component and the second component with the plurality of arms to decrease a diameter of the retention element; and
    disengaging the retention element from both the first component and the second component.

14. A method of manipulating a first component and a second component, the method comprising:
    inserting a tool having a plurality of arms and a lip axially spaced from the arms into a bore of the first component until the lip contacts an axially extending surface of the first component;
    engaging a retention element disposed between the first component and the second component with the plurality of arms to decrease a diameter of the retention element; and
    disengaging the retention element from both the first component and the second component.

15. The method of claim 14, further comprising engaging a plurality of shafts with a conical surface of a driver of the tool to pivot the plurality of arms.

16. The method of claim 15, wherein rotating the driver to vary the height of the driver relative to a main body and plurality of shafts to pivot the plurality of arms.

17. The method of claim 14, wherein the first and second components comprise first and second disks of a gas turbine engine.

18. The method of claim 14, further comprising moving at least one shaft within a channel of a body of the tool to engage the retention element with one of the plurality of arms.

19. The method of claim 18, further comprising rotating the at least one shaft in addition to moving the at least one shaft.

* * * * *